US009788317B2

United States Patent
Ghosh et al.

(10) Patent No.: US 9,788,317 B2
(45) Date of Patent: Oct. 10, 2017

(54) ACCESS POINT (AP), USER STATION (STA) AND METHOD FOR CHANNEL SOUNDING USING SOUNDING TRIGGER FRAMES

(71) Applicant: Intel IP Corporation, Santa Clara, CA (US)

(72) Inventors: Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 105 days.

(21) Appl. No.: 14/752,250

(22) Filed: Jun. 26, 2015

(65) Prior Publication Data

US 2016/0295581 A1    Oct. 6, 2016

Related U.S. Application Data

(60) Provisional application No. 62/139,869, filed on Mar. 30, 2015.

(51) Int. Cl.
*H04W 72/04* (2009.01)
*H04W 74/06* (2009.01)
(Continued)

(52) U.S. Cl.
CPC .......... *H04W 72/0446* (2013.01); *H04L 1/00* (2013.01); *H04L 5/0023* (2013.01);
(Continued)

(58) Field of Classification Search
CPC . H04W 24/10; H04W 72/04; H04W 72/0446; H04W 72/12; H04W 84/12;
(Continued)

(56) References Cited

U.S. PATENT DOCUMENTS 9,226,302 B2 * 12/2015 Suh ................... H04W 72/1226
9,585,165 B2 *  2/2017 Seok .................... H04W 74/08
(Continued)

FOREIGN PATENT DOCUMENTS

WO    WO-2012006472 A2     1/2012
WO    WO-2013157787 A1    10/2013
(Continued)

OTHER PUBLICATIONS

"International Application Serial No. PCT/US2016/016695, Demand/Art 34 Amendments filed Jan. 27, 2017", 13 pgs.
(Continued)

*Primary Examiner* — Tri H Phan
(74) *Attorney, Agent, or Firm* — Schwegman Lundberg & Woessner, P.A.

(57) ABSTRACT

Embodiments of an access point (AP), user station (STA), and method for channel sounding in a wireless network are generally described herein. The AP may transmit a null data packet (NDP) announcement to indicate an NDP time period reserved for transmission of an NDP by the AP. The AP may further transmit a trigger frame for sounding (TFS) to indicate a scheduled sounding feedback period for multiple STAs, which may include identifiers of the STAs. The AP may further receive sounding feedback from at least some of the STAs during the sounding feedback period.

23 Claims, 7 Drawing Sheets

(51) Int. Cl.
  *H04L 1/00* (2006.01)
  *H04L 5/00* (2006.01)
  *H04W 84/12* (2009.01)

(52) U.S. Cl.
  CPC .......... *H04L 5/0048* (2013.01); *H04L 5/0057* (2013.01); *H04L 5/0092* (2013.01); *H04W 74/06* (2013.01); *H04W 84/12* (2013.01)

(58) Field of Classification Search
  CPC . H04W 88/02; H04W 88/08; H04W 72/1226; H04W 74/06; H04W 74/08; H04L 5/00; H04L 1/00; H04L 5/0023; H04L 5/0048; H04L 5/0057; H04L 5/0092; H04L 27/2602
  See application file for complete search history.

(56) References Cited

U.S. PATENT DOCUMENTS

| | | | | |
|---|---|---|---|---|
| 2011/0149882 | A1* | 6/2011 | Gong | H04L 1/1685 370/329 |
| 2012/0140753 | A1* | 6/2012 | Lee | H04B 7/0636 370/338 |
| 2012/0177018 | A1* | 7/2012 | Abraham | H04L 1/0027 370/338 |
| 2012/0250543 | A1* | 10/2012 | Abraham | H04B 7/0626 370/252 |
| 2012/0269183 | A1* | 10/2012 | Sohn | H04L 1/0025 370/338 |
| 2013/0094488 | A1* | 4/2013 | Choi | H04W 16/28 370/338 |
| 2013/0223427 | A1* | 8/2013 | Sohn | H04W 74/06 370/338 |
| 2013/0235947 | A1 | 9/2013 | Yao et al. | |
| 2014/0001045 | A1 | 1/2014 | Harding | |
| 2014/0056204 | A1* | 2/2014 | Suh | H04W 72/1226 370/312 |
| 2015/0085777 | A1* | 3/2015 | Seok | H04W 52/0216 370/329 |
| 2016/0088637 | A1* | 3/2016 | Suh | H04W 72/1226 370/329 |
| 2016/0295581 | A1* | 10/2016 | Ghosh | H04W 72/0446 |
| 2016/0330047 | A1* | 11/2016 | Seok | H04L 27/2602 |

FOREIGN PATENT DOCUMENTS

| | | |
|---|---|---|
| WO | WO-2014011006 A1 | 1/2014 |
| WO | WO-2014029368 A1 | 2/2014 |
| WO | WO-2016160124 A1 | 10/2016 |

OTHER PUBLICATIONS

"International Application Serial No. PCT/US2016/016695, International Search Report mailed Jun. 29, 2016", 3 pgs.
"International Application Serial No. PCT/US2016/016695, Written Opinion mailed Jun. 29, 2016", 7 pgs.
"International Serial No. PCT/US2016/016695, International Preliminary Report on Patentability dated Jul. 13, 2017", 6 pgs.
"International Application Serial No. PCT/US2016/016695, Written Opinion dated May 18, 2017", 6 pgs.
"UL MU Procedure", IEEE 802.11-15/0365r0, LG Electronics, (Mar. 9, 2015), 16 pgs.
Merlin, Simone, "Multi-STA Acknowledgment", IEEE 802.11-15/0366r1, (Mar. 9, 2015), 17 pgs.

* cited by examiner

ACCESS POINT (AP), USER STATION (STA) AND METHOD FOR CHANNEL SOUNDING USING SOUNDING TRIGGER FRAMES

PRIORITY CLAIM

This application claims priority under 35 USC 119(e) to U.S. Provisional Patent Application Ser. No. 62/139,869 filed Mar. 30, 2015 [reference number P82840Z (4884.250PRV)] which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi (HEW) communications. Some embodiments relate to multi-user (MU) multiple-input multiple-output (MIMO) communications and orthogonal frequency division multiple access (OFDMA) communication techniques. Some embodiments relate to channel sounding techniques.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11 ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
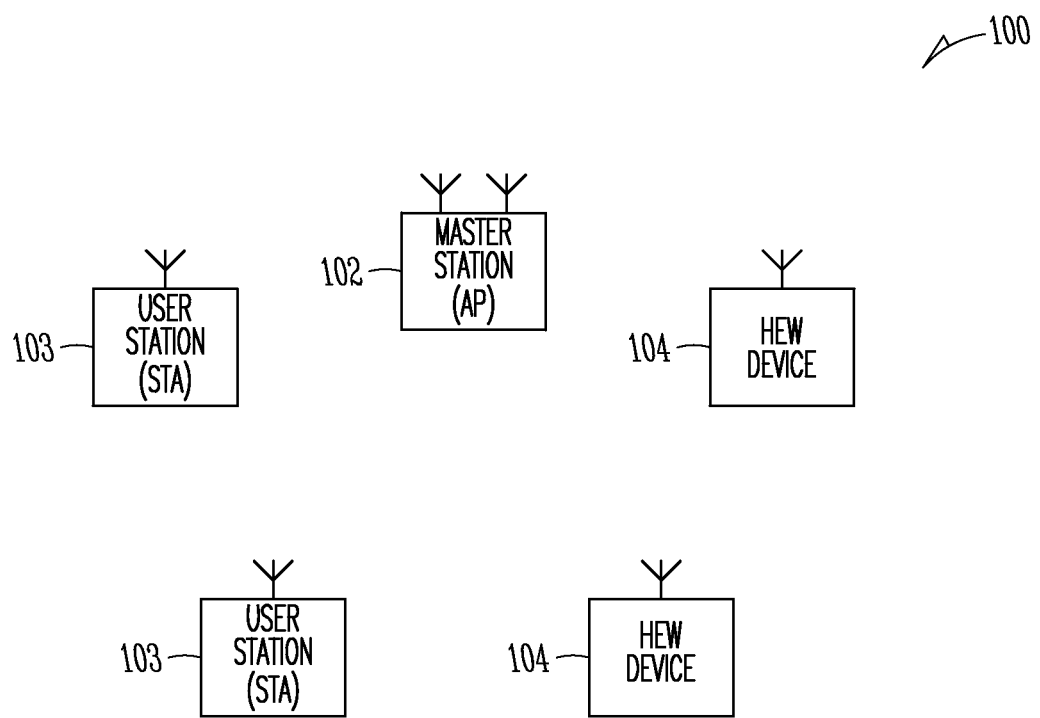
FIG. 1 illustrates a wireless network in accordance with some embodiments.

FIG. 1 illustrates a wireless network in accordance with some embodiments. In some embodiments, the network 100 may be a High Efficiency Wireless Local Area Network (HEW) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

The network 100 may include a master station (STA) 102, a plurality of user stations (STAs) 103 and a plurality of HEW stations 104 (HEW devices). In some embodiments, the STAs 103 may be legacy stations. These embodiments are not limiting, however, as the STAs 103 may be HEW devices or may support HEW operation in some embodiments. The master station 102 may be arranged to communicate with the STAs 103 and/or the HEW stations 104 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the AP 102 may transmit a null data packet (NDP) announcement to indicate an NDP time period reserved for transmission of an NDP by the AP 102. The AP 102 may transmit a trigger frame for sounding (TFS) to indicate a scheduled sounding feedback period for multiple user stations (STAs). The TFS may include identifiers of the STAs 103. The AP 102 may receive sounding feedback from at least some of the STAs 103 during the sounding feedback period. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

Figure 2:
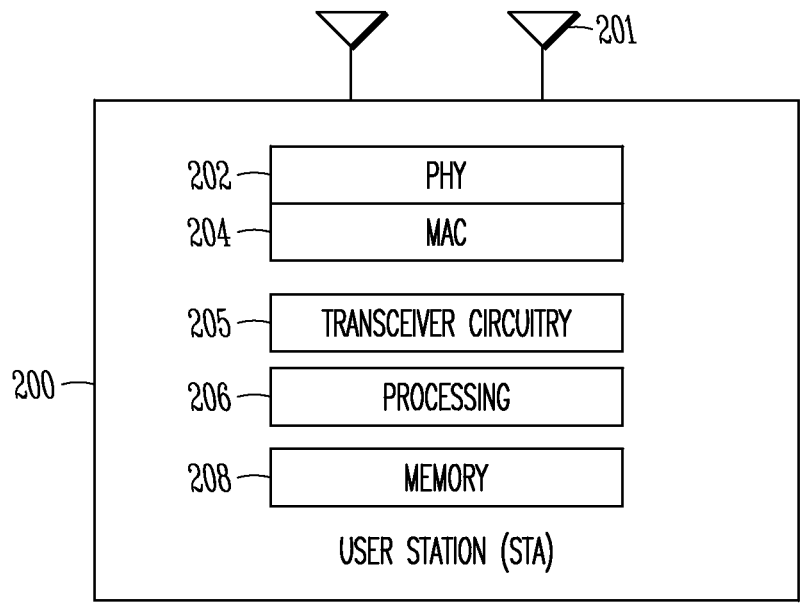
FIG. 2 illustrates a user station (STA) and an access point (AP) in accordance with some embodiments.
Figure 2:
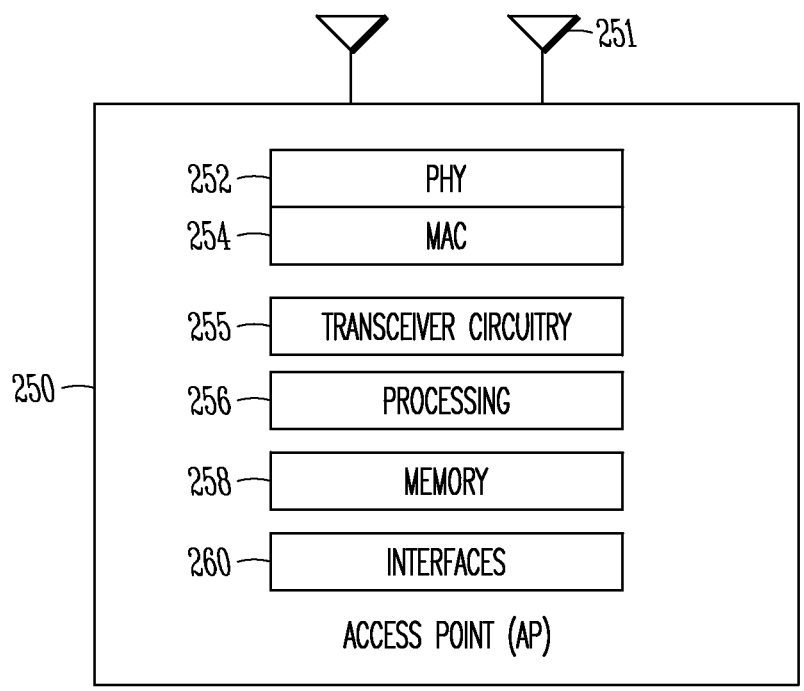

FIG. 2 illustrates a user station (STA) and an access point (AP) in accordance with some embodiments. It should be noted that in some embodiments, the AP 102 may be a stationary non-mobile device. The STA 200 may be suitable for use as an STA 103 as depicted in FIG. 1, while the AP 250 may be suitable for use as an AP 102 as depicted in FIG. 1. In addition, the STA 200 may also be suitable for use as an HEW device 104 as shown in FIG. 1, such as an HEW station.

The STA 200 may include physical layer circuitry 202 and a transceiver 205, one or both of which may enable transmission and reception of signals to and from the AP 250, other APs, other STAs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers.

The AP 250 may include physical layer circuitry 252 and a transceiver 255, one or both of which may enable transmission and reception for transmission and reception of signals to and from the STA 200, other APs, other STAs or other devices using one or more antennas 251. The physical layer circuitry 252 and the transceiver 255 may perform various functions similar to those described regarding the STA 200 previously. Accordingly, the physical layer circuitry 252 and the transceiver 255 may be separate components or may be part of a combined component. In addition, some of the described functionality related to transmission and reception of signals may be performed by a combination that may include one, any or all of the physical layer circuitry 252, the transceiver 255, and other components or layers.

The STA 200 may also include medium access control layer (MAC) circuitry 204 for controlling access to the wireless medium, while the AP 250 may also include medium access control layer (MAC) circuitry 254 for controlling access to the wireless medium. The STA 200 may also include processing circuitry 206 and memory 208 arranged to perform the operations described herein. The AP 250 may also include processing circuitry 256 and memory 258 arranged to perform the operations described herein. The AP 250 may also include one or more interfaces 260, which may enable communication with other components, including other APs 102 (FIG. 1). In addition, the interfaces 260 may enable communication with other components that may not be shown in FIG. 1, including components external to the network 100. The interfaces 260 may be wired or wireless or a combination thereof.

The antennas 201, 251 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 251 may be effectively separated to take advantage of spatial diversity and the different channel characteristics that may result.

In some embodiments, the STA 200 or the AP 250 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 200 or AP 250 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 200, AP 250 or other device may include one or more of a keyboard, a display, a non-volatile memory port, multiple antennas, a graphics processor, an application processor, speakers, and other mobile device elements. The display may be an LCD screen including a touch screen.

Although the STA 200 and the AP 250 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 200 and/or AP 250 may include various components of the STA 200 and/or AP 250 as shown in FIG. 2. Accordingly, techniques and operations described herein that refer to the STA 200 (or 103 or 104) may be applicable to an apparatus for an STA. In addition, techniques and operations described herein that refer to the AP 250 (or 102) may be applicable to an apparatus for an AP.

In some embodiments, the STA 200 may be configured as an HEW device 104 (FIG. 1), and may communicate using OFDM communication signals over a multicarrier communication channel. Accordingly, in some cases the STA 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, the STA 200 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Embodiments disclosed herein provide two preamble formats for High Efficiency (HE) Wireless LAN standards specification that is under development in the IEEE Task Group 11ax (TGax).

In accordance with embodiments, the AP 102 may transmit a null data packet (NDP) announcement to indicate an NDP time period reserved for transmission of an NDP by the AP 102. The AP 102 may further transmit a trigger frame for sounding (TFS) to indicate a scheduled sounding feedback period for multiple STAs 103, which may include identifiers of the STAs 103. The AP 102 may further receive sounding feedback from at least some of the STAs 103 during the sounding feedback period. These embodiments will be described in more detail below.

In some embodiments, the channel resources may be used for downlink transmission by the AP 102 and for uplink transmissions by the STAs 103. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple STAs 103. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 3:
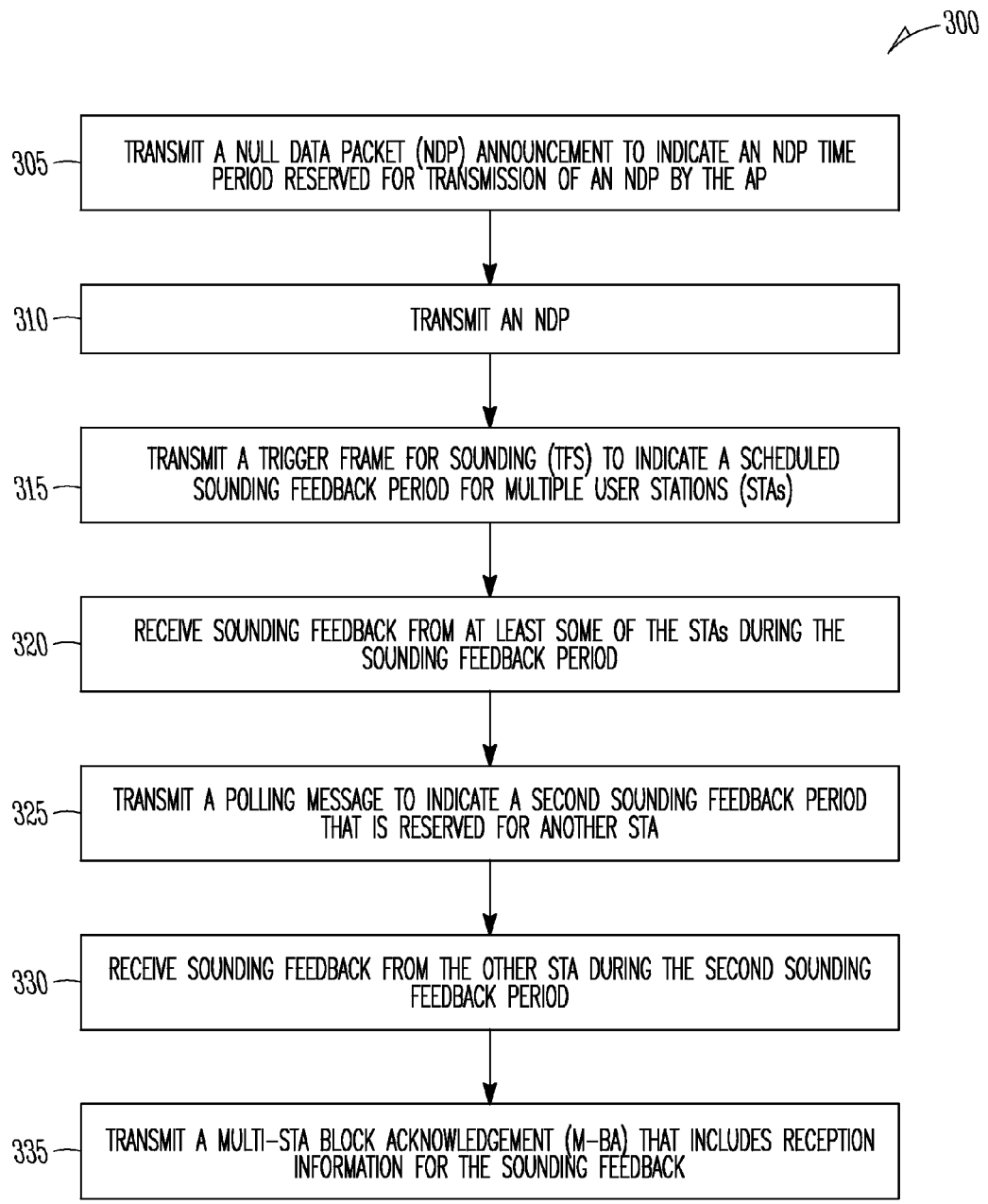
FIG. 3 illustrates the operation of a method of channel sounding in accordance with some embodiments.

FIG. 3 illustrates the operation of a method of channel sounding in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-7, although it is understood that the method 300 may be practiced with any other suitable systems, interfaces and components.

In addition, while the method 300 and other methods described herein may refer to STAs 103 and APs 102 operating in accordance with 802.11 or other standards, embodiments of those methods are not limited to just those devices and may also be practiced on other mobile devices, such as an HEW STA, an HEW AP, an Evolved Node-B (eNB) or User Equipment (UE). In some embodiments, the STA 103 described in the method 300 may be an HEW STA 103 while the AP 102 may be an HEW AP 102. The method 300 and other methods described herein may also be practiced by wireless devices configured to operate in other suitable types of wireless communication systems, including systems configured to operate according to various Third Generation Partnership Project (3GPP) Long Term Evolution (LTE) standards. The method 300 may also refer to an apparatus for an STA 103 and/or AP 102 or other device described above.

It should be pointed out that in some embodiments of the method 300 and other methods described herein, the AP 102 may be or may operate as a "beam-former" while the STA 103 may be or may operate as a "beam-formee." That is, the method 300 may enable usage of beam-formed paths for downlink communication between the AP 102 (beam-former) and the STA 103 (beam-formee) in some cases.

At operation 305 of the method 300, the AP 102 may transmit a null data packet (NDP) announcement to indicate an NDP time period reserved for transmission of an NDP by the AP 102. The NDP may be transmitted during the NDP time period at operation 310. It should be noted that the NDP announcement may also be referred to as an "NDP-A" or an "NDP-A message." The NDP time period may also be referred to as a "sounding period" or a "channel sounding period" or similar.

The NDP may include a training sequence or training pattern to enable STAs 103 to measure a channel response, a signal quality, a signal level, beam-forming weights or other quantities or parameters. As an example, the NDP may be based on a particular bit sequence, signal or waveform. The STAs 103 may use predetermined knowledge of the NDP, in some cases, to perform such measurements.

Accordingly, the STAs 103 may refrain from transmission during the NDP time period to reduce or minimize interference for the measurements. As an example, the NDP-A may serve to announce such a silence period. As another example, the NDP-A may instruct STAs 103 that may be listening to the AP 102 to refrain from transmission during the NDP time period.

It should be noted that the NDP-A and NDP may be included as part of one or more 802.11 standards or other standards, but embodiments are not limited to these particular messages. As an example, other messages may provide the same functionality or purpose, and may or may not be part of an 802.11 standard or other standard. As another example, the NDP-A may be referred to as a "sounding announcement message" or similar in some cases. As another example, the NDP may be referred to as a "sounding message" or similar in some cases.

Figure 4:
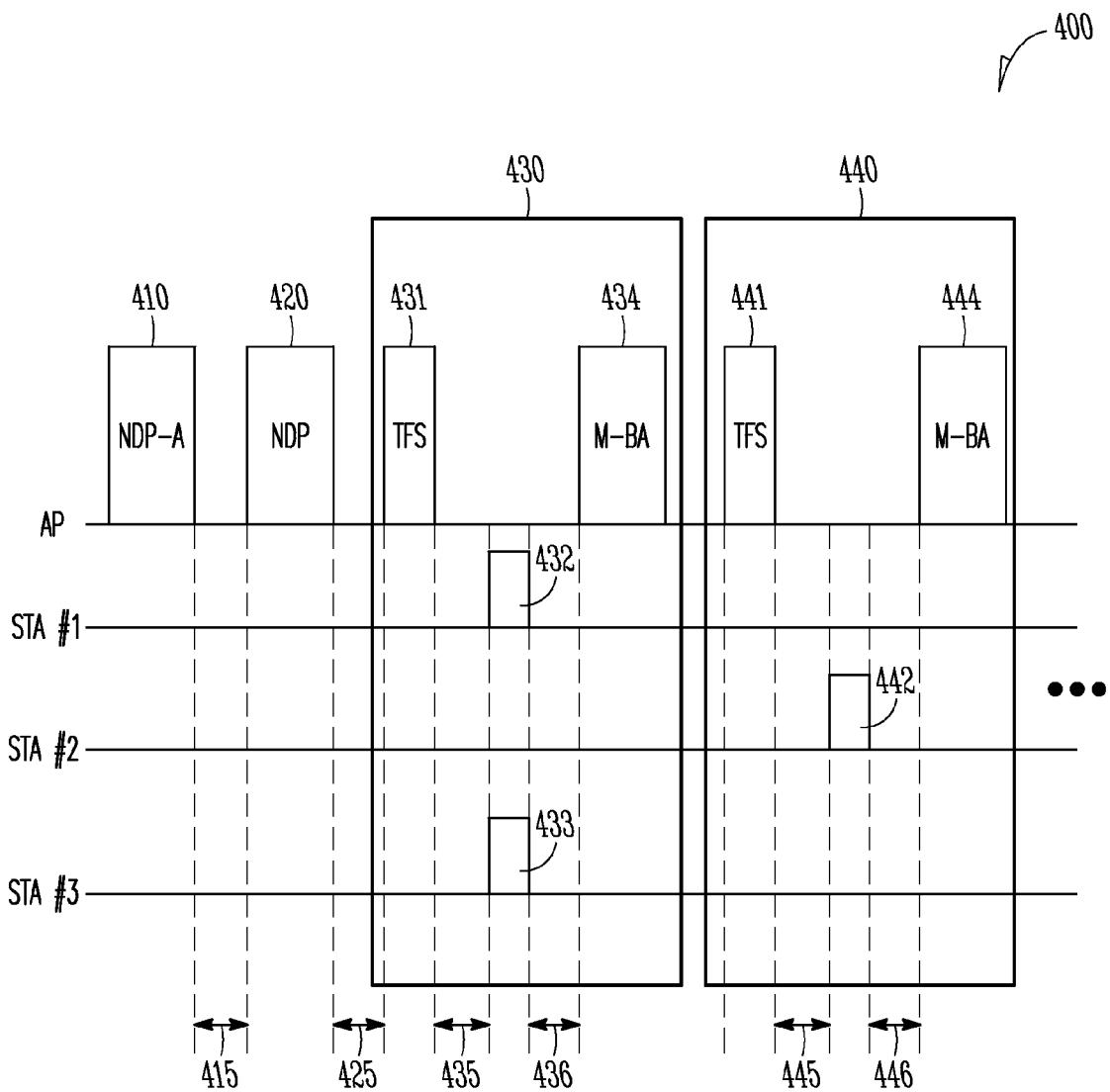
FIG. 4 illustrates an example of a channel sounding scenario in accordance with some embodiments.

FIG. 4 illustrates an example of a channel sounding scenario in accordance with some embodiments. It should be noted that the scenario 400 may serve to illustrate some or all of the concepts and techniques described herein, but embodiments are not limited to the example scenario 400. For instance, embodiments are not limited to the number of STAs 103 and APs 102 shown, and are also not limited to the number or type of frames shown (NDP-A, NDP, TFS, M-BA or other). Embodiments are also not limited to the ordering, arrangement and timing of the frames as shown in FIG. 4. It should also be noted that some embodiments may include fewer frames than what is shown in FIG. 4. Some embodiments may include additional frames or other elements not shown in FIG. 4.

The NDP-A 410 may be transmitted by the AP 102, and may be received by the STAs 103 labeled as STA #1, STA #2, and STA #3. After an SIFS 415 has elapsed, the AP 102 may transmit the NDP 420 that is announced by the NDP-A 410. It should be noted that the use of the SIFS 415 here and elsewhere in FIG. 4 (425, 435, 436, 445, 446) is not limiting, as other time intervals may be used in some cases.

At operation 315 of the method 300, a trigger frame for sounding (TFS) may be transmitted by the AP 102. In some embodiments, the TFS may indicate a scheduled sounding feedback period for multiple STAs 103. The sounding feedback period may be reserved for or allocated for transmission of sounding feedback from at least some of the STAs 103. Accordingly, the TFS may inform the STAs 103 that the sounding feedback period is available or may instruct the STAs 103 to transmit sounding feedback. The TFS may also indicate a timing for the sounding feedback period, such as a starting time or other time.

It should be noted that embodiments are not limited to separate TFS and NDP announcements. As an example, the TFS and NDP announcement may be combined. As another example, the TFS may provide some of the same functionality as the NDP announcement, such as the indication of the NDP time period reserved for transmission of an NDP by the AP 102. As another example, the NDP announcement may be included in the TFS. As another example, the NDP announcement may include the TFS.

In addition, multiple TFS may be transmitted in some embodiments. As an example, from a set of STAs 103 indicated in the NDP announcement, one of the TFS may poll a subset of the set of STAs 103 for transmission of sounding feedback during a first sounding feedback period. Another TFS may poll another subset of the set of STAs 103 for transmission of sounding feedback during a second sounding feedback period. Additional TFS may be used in some cases.

As another example, STAs 103 indicated in a first TFS may be a subset of the set of STAs indicated in the NDP announcement. STAs 103 indicated in a following TFS may include one or more STAs 103 indicated in the first TFS and may also include additional STAs 103 not indicated in the first TFS. The STAs 103 indicated in both may include STAs 103 for which a retransmission is desired or needed by the AP 102 due to incorrect reception of their sounding feedback or other reason.

In some embodiments, the TFS may include various parameters related to the STAs 103 and/or the transmission of sounding feedback by the STAs 103. Some embodiments may include one or more parameters such as identifiers of the STAs 103, modulation and coding schemes (MCS) to be used, transmit power levels to be used, and channel resource allocations for the STAs 103, and may also include other related parameters. In some embodiments, the TFS may include parameters for each STA 103 and may also include other parameters intended for all of the STAs 103. For instance, an identifier, an MCS, a transmit power level, and a channel resource allocation may be included for each STA 103 while a frame duration parameter may indicate a frame duration to be used by all STAs 103.

In some embodiments, the TFS may include a sounding dialog token that may be related to a frame counter or a sequence counter. The sounding dialog token may be the same as, or may be based on, a dialog token included in another frame, such as an NDP-A frame. For instance, the NDP-A, NDP, TFS and other frames (like the M-BA to be described below) may be included in a sounding sequence. The sounding dialog token and other dialog tokens may indicate a time index or frame index of the sounding sequence.

In some embodiments, the channel resources used by the STAs 103 for uplink transmissions may include multiple sub-channels of a predetermined bandwidth, one or more of which may be used for the sounding feedback during the sounding feedback period. As an example, each STA 103 may be allocated one or more sub-channels for the transmission of the sounding feedback, and indexes (or identifiers) of those sub-channels may be included in the TFS.

Referring back to the example channel sounding scenario 400 in FIG. 4, the TFS 431 may be transmitted when a time duration of the SIFS 425 has elapsed since the transmission of the NDP 420. The TFS 431 may indicate a first sounding feedback period. In addition, a second TFS 441 may also be transmitted for a second sounding feedback period.

Figure 5:
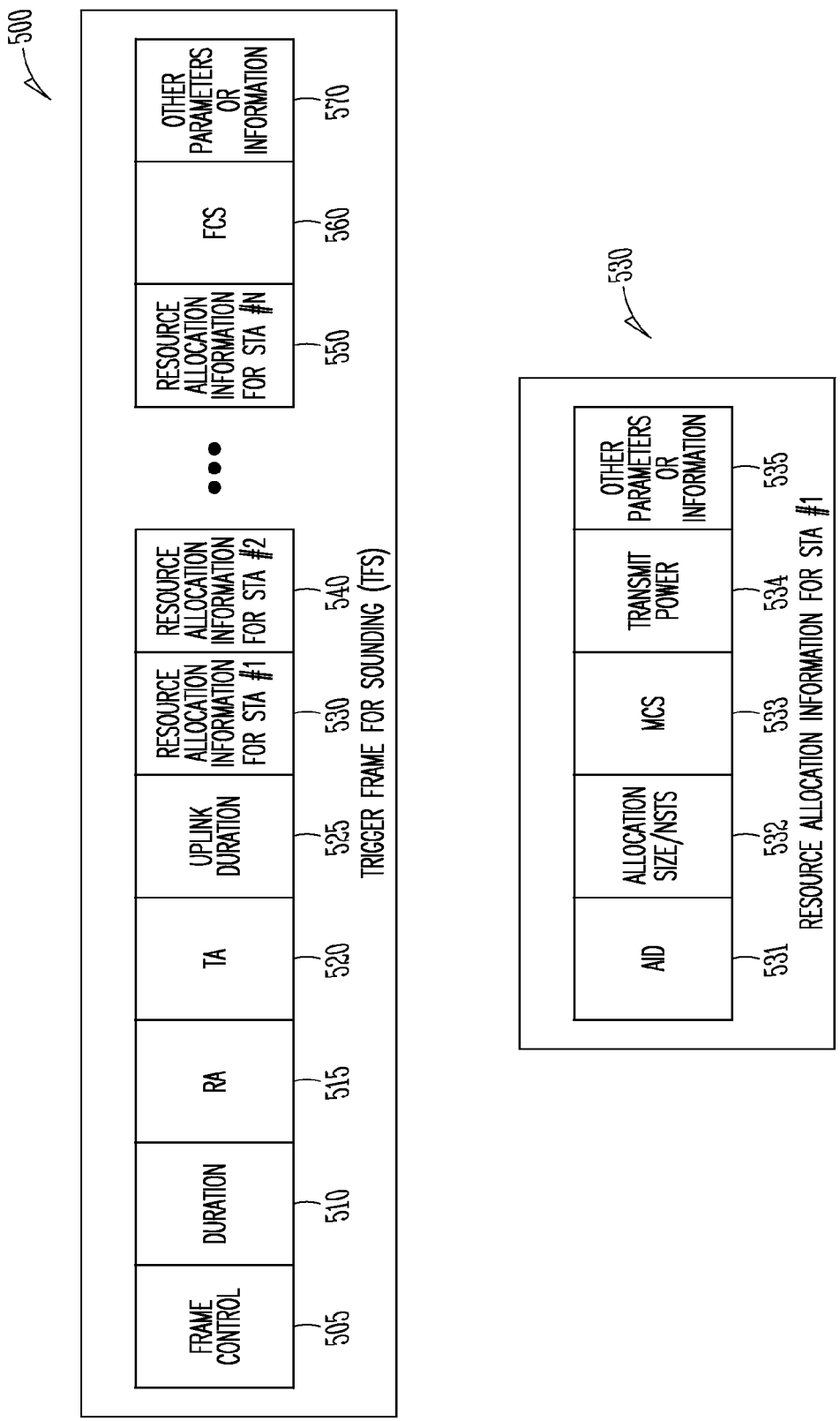
FIG. 5 illustrates an example of a trigger frame for sounding (TFS) in accordance with some embodiments.

FIG. 5 illustrates an example of a trigger frame for sounding (TFS) in accordance with some embodiments. It should be noted that embodiments are not limited by the ordering, format or presentation of the parameters and information as shown in FIG. 5. In addition, some embodiments of the TFS 500 may or may not include some or all of the parameters and information shown, and may also include additional parameters and information not shown in FIG. 5. In some embodiments, some or all of the parameters included in the TFS 500 may be similar to or the same as parameters included in one or more 802.11 standards. The scope of embodiments is not limited in this respect, however. Values for the parameters may be specified in terms of any suitable number of bits, including Boolean arrangements in which a bit may be used to indicate 0/1, yes/no or similar.

Various parameters that may be included in the TFS 500 will be described below. The frame control 505 may indicate information such as a protocol version, frame type or sub-frame type. The duration 510 may indicate a duration of a packet that is expected in response to the current packet (i.e. the TFS 500). The RA 515 may indicate a broadcast address while the TA 520 may indicate a medium access control (MAC) address of the AP 102. The uplink duration 525 may indicate a duration for a compress beam-forming feedback frame or other sounding feedback frame. As a non-limiting example, the value for the uplink duration 525 may be equal to the value in the duration 510 minus a time used for a multi-STA block acknowledgement (M-BA) frame minus an SIFS value multiplied by two.

The TFS 500 may include a resource allocation information block 530 for STA #1, which is shown in more detail in the bottom portion of FIG. 5. In some embodiments, the parameters 531-535 may be grouped into the resource allocation information block 530 as shown in FIG. 5, although embodiments are not limited to such groupings. For instance, some or all of the parameters or information shown within the block 530 (and within blocks for other STAs 103 such as 540 and 550) may be included elsewhere in the TFS 500 in some arrangements.

Various parameters that may be included in the resource allocation information block 530 will be described below. The association identifier (AID) 531 or other similar identifier may identify the STA 103 for which the resource allocation information block 530 is intended. The resource allocation information block 530 may also include various parameters for the sounding feedback transmission by the STA 103. The allocation size/NSTS 532 may indicate a bandwidth of channel resources and/or a number of space-time streams (NSTS) assigned to the STA 103 for the sounding feedback transmission. The MCS 533 may indicate an assigned or expected modulation and coding scheme (MCS) to be used for the transmission. The transmit power 534 may indicate an assigned or expected transmit power level to be used for the transmission. The resource allocation information block 530 may also include other parameters or information 535, which may or may not be related to the resource allocation for the STA 103. As an example, control information for the resource allocation information block 530 may be included in 535.

The TFS 500 may further include additional resource allocation information blocks for other STAs 103. As an example, the resource allocation information block 540 for STA #2 and the resource allocation information block 550 for STA #N may be included. In some embodiments, the TFS 500 may include a resource allocation block for each STA 103 for which the sounding feedback period is reserved or allocated. Although not limited as such, the other resource allocation information blocks, such as 540, 550 and others, may be of a similar format as the resource allocation information block 530 in some cases.

The TFS 500 may further include a frame check sequence 560, which may be similar to or the same as a cyclic redundancy check (CRC) or a checksum. In addition, the TFS 500 may include other parameters or information 570, which may or may not be related to channel sounding or resource allocation. As an example, control information for the TFS 500 may be included in 570.

At operation 320, the AP 102 may receive sounding feedback from at least some of the STAs 103 during the sounding feedback period. Although not limited as such, the sounding feedback may be received according to channel resource allocations for the STAs 103 included in the TFS. In some embodiments, the sounding feedback may be based at least partly on receptions of the NDP at the STAs 103. For instance, the sounding feedback may include or may be based on measurements such as those previously described like a channel response, a signal quality, a signal level, beam-forming weights or other quantities or parameters.

In some embodiments, the sounding feedback may include beam-forming measurements related to one or more transmission paths between the AP 102 and the STAs 103. As an example, a particular STA 103 may transmit sounding feedback related to beam-forming measurements related to one or more transmission paths between the AP 102 and the particular STA 103. In some embodiments, the beam-forming measurements may include one or more compressed beam-forming frames, which may include such beam-forming measurements in a compressed or reduced format.

It should also be pointed out that the reception of the sounding feedback from the multiple STAs 103 may include the use of beam-forming techniques. As an example, the AP 102 may determine one or more antenna patterns for a particular STA 103 such that a signal from that STA 103 may be determined, even when it is part of a composite signal from multiple STAs 103 transmitted in overlapping time and/or frequency resources.

In some embodiments, sounding feedback from multiple STAs 103 may be received during one or more time periods that at least partially overlap. That is, the sounding feedback may include sounding feedback contributions transmitted from multiple STAs 103 in time windows that at least partially overlap. As an example, a first portion of the sounding feedback may be received from a first STA 103 during a first time period. A second portion of the sounding feedback may be received from a second STA 103 during a second time period that at least partly overlaps the first time period. Accordingly, the sounding feedback during an overlapping portion of the time period may include a combination or a sum of individual sounding feedback contributions from the first STA 103 and the second STA 103.

Referring back to the example channel sounding scenario 400 in FIG. 4, STA #1 may transmit an individual sounding feedback 432 during a first sounding feedback period. The STA #3 may also transmit an individual sounding feedback 433 during the first sounding feedback period. Accordingly, the two STAs 103 may perform those transmissions during overlapping time periods. In addition, in the example scenario 400, STA #2 may transmit an individual sounding feedback 442 in response to the TFS 441 during a second sounding feedback period.

At operation 325, the AP 102 may transmit a polling message to indicate a second sounding feedback period that is reserved for one or more other STAs 103 that are excluded from the STAs 103 identified in the TFS. The AP 102 may receive sounding feedback from at least one of the other STAs 103 during the second sounding feedback period at operation 330. As an example, the second sounding period may be a dedicated sounding period and may be reserved exclusively for the other STAs 103. As another example, at least one of the other STAs 103 for which the second sounding feedback period is reserved may have been identified in the TFS. For instance, the AP 102 may not receive sounding feedback from those STAs 103 during the sounding feedback period for the TFS, in some cases. This may occur for reasons such as unsuccessful reception, failure of those STAs 103 to send the sounding feedback or other reason. Accordingly, the AP 102 may schedule those STAs 103 to transmit sounding feedback again during the second sounding feedback period. In some cases, operations 325 and 330 may be repeated for additional polling messages and dedicated sounding periods for additional STAs 103 excluded from the STAs 103 identified in the TFS. In some embodiments, operations 325 and 330 may be performed to enable sounding for legacy STAs 103, although such embodiments are not limiting. In some embodiments, the polling message may be included in a TF. In some embodiments, the polling message may include a TF.

At operation 335, the AP 102 may transmit a multi-STA block acknowledgement (M-BA) that includes reception information for sounding feedback received from the STAs 103 identified in the TFS. In some embodiments, the M-BA may further include reception information for another STA 103 that is excluded from the STAs 103 identified in the TFS.

Referring back to the example channel sounding scenario 400 in FIG. 4, the M-BA 434 may be transmitted by the AP 102, and may include feedback based on the individual sounding feedback 432, 433 transmitted by STA #1 and STA #3. In addition, the M-BA 444 may be transmitted by the AP 102, and may include feedback based on the individual sounding feedback 442 transmitted by STA #2.

It should be noted that the example scenario 400 in FIG. 4 indicates a first sequence 430 that includes the TFS 431, the uplink transmissions 432, 433 for a first sounding feedback period, and the M-BA 434. In addition, a second sequence 440 includes the TFS 441, the uplink transmission 442 for a second sounding feedback period, and the M-BA 444. Accordingly, the example scenario 400 shows two sounding feedback periods, but embodiments are not limited to this number. As an example, a single sounding feedback period may be used. As another example, two or more sounding feedback periods may be used. As another example, additional frames may be included, such as polling messages for other STAs 103 and additional sounding feedback periods to accommodate those STAs 103.

Figure 6:
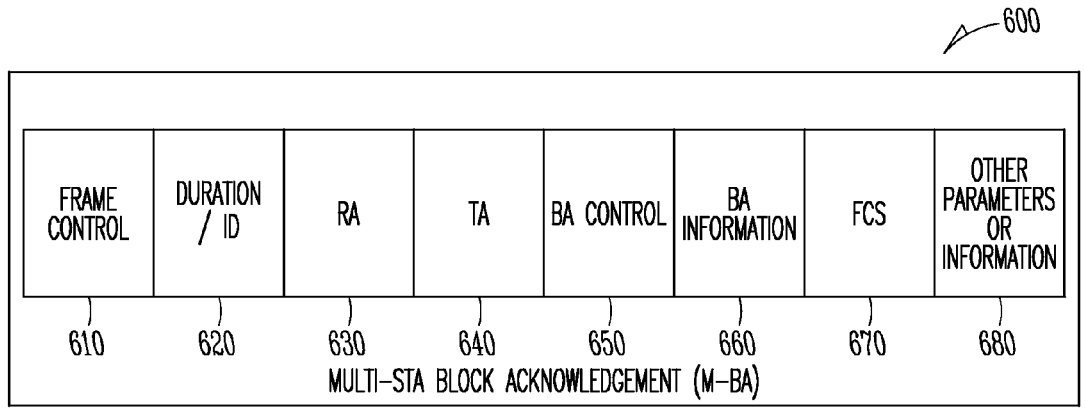
FIG. 6 illustrates an example of a multi-STA block acknowledgement (M-BA) in accordance with some embodiments.
Figure 6:
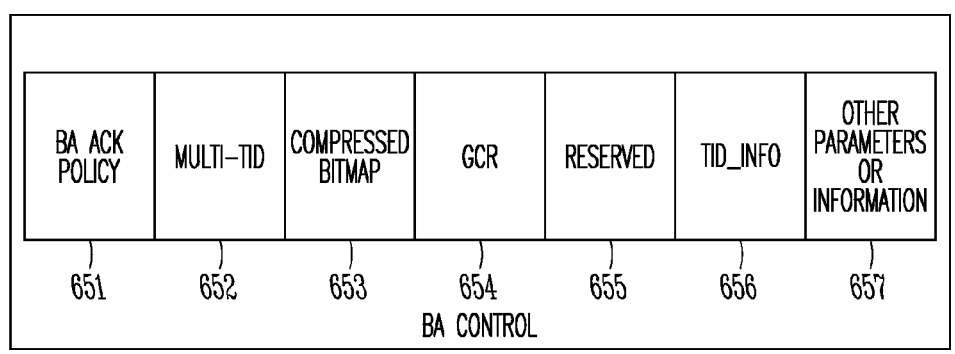
Figure 6:
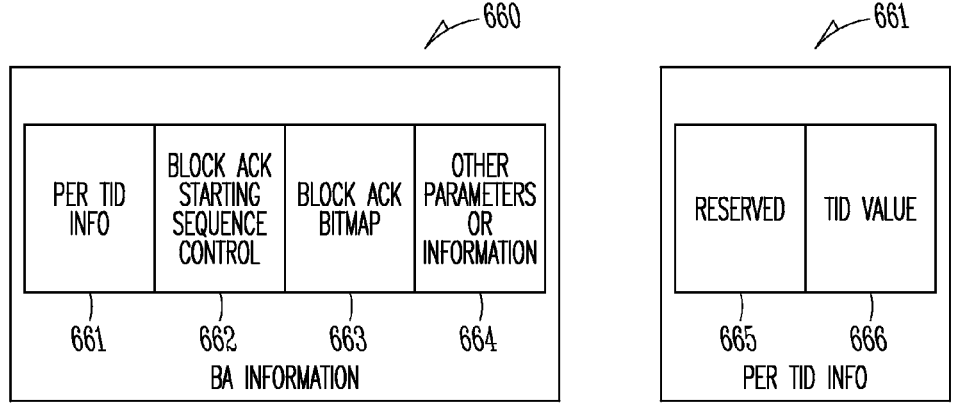

FIG. 6 illustrates an example of a multi-STA block acknowledgement (M-BA) in accordance with some embodiments. It should be noted that embodiments are not limited by the ordering, format or presentation of the parameters and information as shown in FIG. 6. In addition, some embodiments of the M-BA 600 may or may not include some or all of the parameters and information shown, and may also include additional parameters and information not shown in FIG. 6. Values for the parameters may be specified in terms of any suitable number of bits, including Boolean arrangements in which a bit may be used to indicate 0/1, yes/no or similar.

In some embodiments, some or all of the parameters included in the M-BA 600 may be similar to or the same as parameters included in one or more 802.11 standards, although the scope of embodiments is not limited in this respect. As an example, an uplink multi-user (UL-MU) ACK message may be used to acknowledge uplink reception of packets in a multi-user 802.11 configuration. Some parameters included in the UL-MU ACK message may be included in the M-BA 600 or may be similar to parameters included in the M-BA 600.

Various parameters that may be included in the M-BA 600 will be described below. The M-BA may include a frame control 610, duration/ID 620, RA 630, TA 640, and FCS 670. In some embodiments, these parameters may be related to or similar to parameters previously used in the TFS 500 shown in FIG. 5, although the scope of embodiments is not limited in this respect. It should be noted that the duration/ID 620 may be similar to the duration parameter 510 shown in FIG. 5 in some cases. However, the duration/ID 620 may also include identifier information in addition to, or instead of, frame duration information.

The M-BA 600 may include the Block ACK (BA) Control block 650, which is shown in more detail in the middle portion of FIG. 6. In some embodiments, the parameters 651-657 may be grouped into the BA Control block 650 as shown in FIG. 6, although embodiments are not limited to such groupings. For instance, some or all of the parameters or information shown within the block 650 may be included elsewhere in the M-BA 600 in some arrangements.

The M-BA 600 may include the Block ACK (BA) Information block 660, which is shown in more detail in the bottom portion of FIG. 6. In some embodiments, the parameters 661-666 may be grouped into the BA Information block 660 as shown in FIG. 6, although embodiments are not limited to such groupings. For instance, some or all of the parameters or information shown within the block 660 may be included elsewhere in the M-BA 600 in some arrangements.

In some embodiments, some of the parameters shown in FIG. 6 may function in a similar manner to those included in an UL-MU ACK message previously described. Other parameters in those embodiments may be modified for M-BA 600 operation. As a non-limiting example, some of the parameters, such as the TID INFO 656, TID VALUE 666, Block ACK Starting Sequence Control 662, and Block ACK Bitmap 663, may be modified in some cases. For instance, some or all of the bits available in a particular parameter may be substituted with a known pattern, discarded, set to a random value, or populated with other information. Accordingly, some of the bits normally used in the UL-MU ACK message may be considered "reserved" or "unused" for M-BA 600 operation.

As an example, when the M-BA 600 is an ending frame of a sounding sequence, the TID INFO 656, the TID VALUE 666, and the Block ACK Starting Sequence Control 662 may be reserved. As another example, the first octet of the Block ACK Bitmap 663 may be interpreted as a bitmap for transmitted portions and the remaining octets may be reserved.

Figure 7:
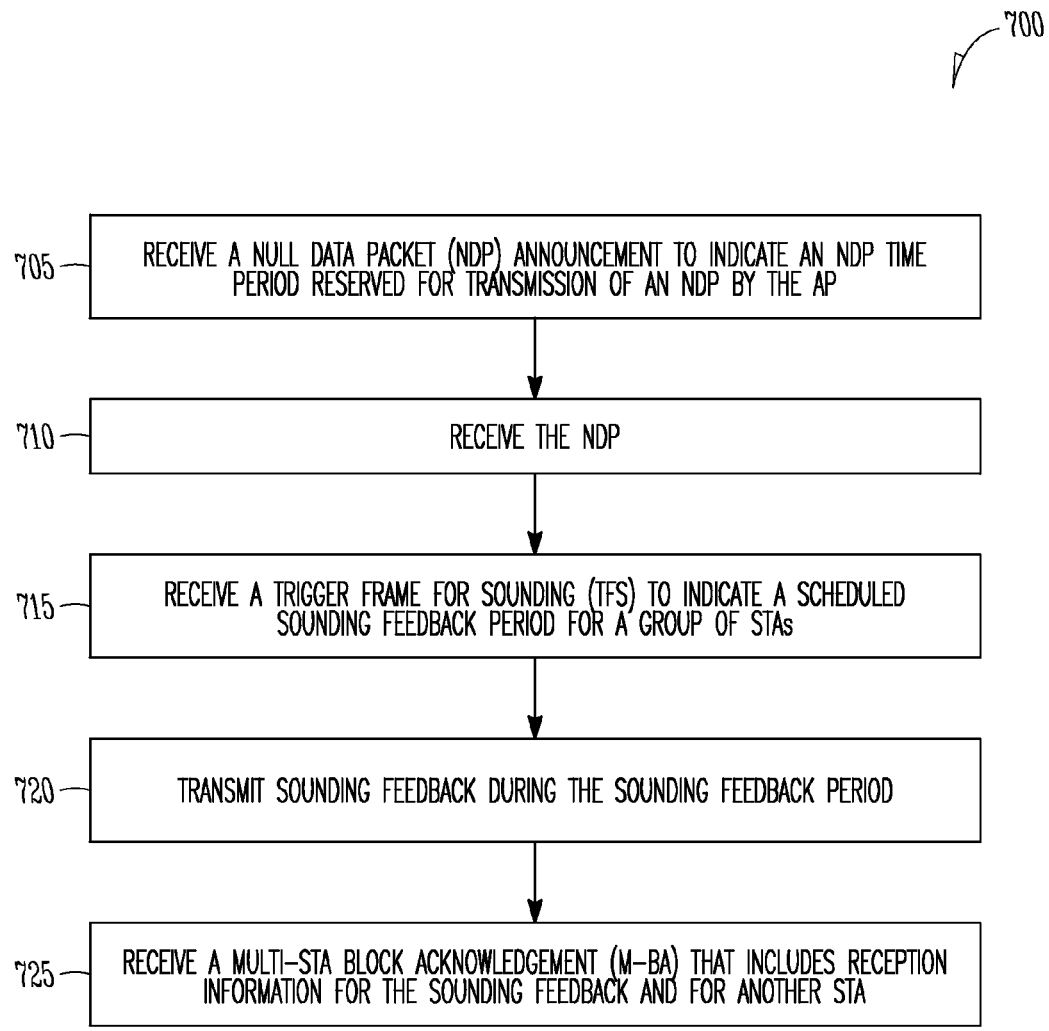
FIG. 7 illustrates the operation of another method of channel sounding in accordance with some embodiments.

FIG. 7 illustrates the operation of another method of channel sounding in accordance with some embodiments. As mentioned previously regarding the method 300, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6, although it is understood that the method 700 may be practiced with any other suitable systems, interfaces and components. In addition, embodiments of the method 700 may refer to APs, STAs, eNBs 104, UEs 102, HEW APs, HEW STAs or other wireless or mobile devices. The method 700 may also refer to an apparatus for an STA 103 and/or AP 102 or other device described above.

It should be noted that the method 700 may be practiced at an STA 103, and may include exchanging of signals or messages with an AP 102. Similarly, the method 300 may be practiced at the AP 102, and may include exchanging of signals or messages with the STA 103. In some cases, operations and techniques described as part of the method 300 may be relevant to the method 700. In addition, embodiments may include operations performed at the STA 103 that are reciprocal or similar to other operations described herein performed at the AP 102. For instance, an operation of the method 700 may include reception of a frame by the STA 103 while an operation of the method 300 may include transmission of the same frame or similar frame by the AP 102.

In addition, previous discussion of various techniques and concepts may be applicable to the method 700 in some cases, including the NDP-A, NDP, TFS, M-BA, sounding feedback, and the sounding feedback period. Other concepts previously described, such as the channel resources, sub-channels, and sub-carriers may also be applicable to the method 700. In addition, the example scenario shown in FIG. 4 may also be applicable, in some cases.

At operation 705, the STA 103 may receive a null data packet (NDP) announcement to indicate an NDP time period reserved for transmission of an NDP by the AP 102. The STA 103 may receive the NDP at operation 710. At operation 715, the STA 103 may receive a trigger frame for sounding (TFS) to indicate a scheduled sounding feedback period for a group of STAs 103. In some cases, the STA 103 may be included in the group of STAs 103.

At operation 720, the STA 103 may transmit, during the sounding feedback period, sounding feedback based at least partly on a reception of the NDP at the STA 103. Previously described measurements may be used, including a channel response, a signal quality, a signal level, beam-forming weights or other quantities or parameters.

At operation 725, the STA 103 may receive a multi-STA block acknowledgement (M-BA) from the AP 102. In some embodiments, the M-BA may include reception information for the sounding feedback and reception information for another STA 103 that is excluded from the group of STAs 103. Accordingly, the M-BA may be intended not only for the group of STAs 103, but for one or more other STAs excluded from the group. In some embodiments, the other STAs 103 may be legacy STAs 103, although such embodiments are not limiting.

An example of an apparatus for an access point (AP) is disclosed herein. The apparatus may comprise transceiver circuitry and hardware processing circuitry. The hardware processing circuitry may configure the transceiver circuitry to transmit a null data packet (NDP) announcement to indicate an NDP time period reserved for transmission of an NDP by the AP. The hardware processing circuitry may further configure the transceiver circuitry to transmit a trigger frame for sounding (TFS) to indicate a scheduled sounding feedback period for multiple user stations (STAs). The TFS may include identifiers of the STAs. The hardware processing circuitry may further configure the transceiver circuitry to receive sounding feedback from at least some of the STAs during the sounding feedback period.

In some examples, the hardware processing circuitry may further configure the transceiver circuitry to transmit a polling message to indicate a second sounding feedback period that is reserved for one or more other STAs that are excluded from the STAs identified in the TFS. The hardware processing circuitry may further configure the transceiver circuitry to receive sounding feedback from at least one of the other STAs during the second sounding feedback period. In some examples, the polling message may be included in a trigger frame (TF). In some examples, the second sounding feedback period may be further reserved for at least one STA identified in the TFS. In some examples, the sounding feedback may be based at least partly on receptions of the NDP at the STAs. In some examples, the sounding feedback may include beam-forming measurements related to one or more links between the AP and the STA. In some examples, the sounding feedback may be received according to channel resource allocations for the STAs included in the TFS.

In some examples, a first portion of the sounding feedback may be received from a first STA during a first time period. A second portion of the sounding feedback may be received from a second STA during a second time period that at least partly overlaps the first time period. In some examples, the TFS may further include modulation and coding schemes (MCS) and transmit powers to be used by the STAs for the sounding feedback. In some examples, the hardware processing circuitry may further configure the transceiver circuitry to transmit a multi-STA block acknowledgement (M-BA) that includes reception information for the sounding feedback.

In some examples, the NDP announcement, the TFS, and the M-BA may be included in a sounding sequence. The NDP announcement and the TFS may include a dialog token that is based on a frame counter for the sounding sequence. In some examples, the M-BA may further include reception information for another STA that is excluded from the STAs identified in the TFS. In some examples, the AP and the STA may be configured to operate in a high-efficiency wireless local area network (HEW) that supports uplink beam-forming for the sounding feedback. In some examples, the apparatus may further comprise one or more antennas coupled to the transceiver circuitry for the transmission of the NDP announcement, the transmission of the TFS, and the reception of the sounding feedback.

An example of a non-transitory computer-readable storage medium that stores instructions for execution by one or more processors of an access point (AP) to perform operations for sounding is also disclosed herein. The operations may configure the one or more processors to transmit a trigger frame for sounding (TFS) to indicate a first sounding feedback period reserved for a group of user stations (STAs). The operations may further configure the one or more processors to receive, during the first sounding feedback period, first sounding feedback based on receptions at the group of STAs of a null data packet (NDP) transmitted by the AP. The operations may further configure the one or more processors to transmit a polling message that indicates a second sounding feedback period reserved for a legacy STA excluded from the group of STAs. The operations may further configure the one or more processors to receive, during the second sounding feedback period, second sounding feedback based on a reception of the NDP at the legacy STA.

In some examples, the first sounding feedback may include sounding feedback from multiple STAs received during time periods that at least partially overlap. In some examples, the operations may further configure the one or more processors to transmit an NDP announcement to indicate an NDP time period reserved for transmission of the NDP by the AP. In some examples, the TFS may include identifiers for the group of STAs and channel resource allocations for transmission of sounding feedback by the STAs. In some examples, the operations may further configure the one or more processors to transmit a multi-STA block acknowledgement (M-BA) that includes reception information for the first sounding feedback and reception information for the second sounding feedback. In some examples, the TFS may include an NDP announcement to indicate an NDP time period reserved for the transmission of the NDP by the AP.

An example of a method of channel sounding performed at an access point (AP) is also disclosed herein. The method may comprise transmitting a null data packet (NDP) announcement to indicate an NDP time period reserved for transmission of an NDP by the AP. The method may further comprise transmitting a trigger frame for sounding (TFS) to indicate a scheduled sounding feedback period for multiple user stations (STAs). The TFS may include identifiers of the STAs. The method may further comprise receiving sounding feedback from at least some of the STAs during the sounding feedback period. In some examples, the method may further comprise transmitting a polling message to indicate a second sounding feedback period that is reserved for another STA that is excluded from the STAs identified in the TFS. The method may further comprise receiving sounding feedback from the other STA during the second sounding feedback period.

An example apparatus for a user station (STA) is also disclosed herein. The apparatus may comprise transceiver circuitry and hardware processing circuitry. The hardware processing circuitry may configure the transceiver circuitry to receive a null data packet (NDP) announcement to indicate an NDP time period reserved for transmission of an NDP by the AP. The hardware processing circuitry may further configure the transceiver circuitry to receive a trigger frame for sounding (TFS) to indicate a scheduled sounding feedback period for a group of STAs, wherein the STA is included in the group of STAs. The hardware processing circuitry may further configure the transceiver circuitry to transmit, during the sounding feedback period, sounding feedback based at least partly on a reception of the NDP at the STA.

In some examples, the hardware processing circuitry may further configure the transceiver circuitry to receive a multi-STA block acknowledgement (M-BA), the M-BA including reception information for the sounding feedback and reception information for another STA that is excluded from the group of STAs. In some examples, the AP may be a high-efficiency wireless local area network (HEW) AP and the STAs in the group of STAs may be HEW STAs. In some examples, the apparatus may further comprise one or more antennas coupled to the transceiver circuitry for the reception of the NDP announcement, the reception of the TFS, and the transmission of the sounding feedback.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) configured for transmit beamforming and downlink (DL) multiuser (MU) multiple-input multiple output (MIMO) (DL-MU-MIMO) operation, the apparatus comprising: memory; and processing circuitry, configured to:
    encode a null data packet (NDP) announcement frame (NDP-A) and an a high-efficiency (HE) NDP, the NDP-A followed by the HE NDP to initiate an HE sounding protocol, the HE NDP configured to be transmitted a short interframe space (SIFS) after transmission of the NDP-A;
    encode a receiver address (RA) of the NDP-A to indicate a broadcast address to solicit multi-user (MU) feedback;
    configure the HE NDP to include a plurality of HE long-training fields (HE-LTFs) comprising training signals;
    encode a trigger frame for transmission a SIFS after the HE NDP, the trigger frame identifying each of a plurality of stations (STAs), the trigger frame to indicate channel resources that the STAs are to use for channel estimates;
    decode HE compressed beamforming feedback frames received from the STAs, the HE compressed beamforming feedback frames received within a same transmission opportunity (TXOP) during which the trigger frame was transmitted; and
    determine parameters for beamforming from the training signals and the compressed beamforming feedback for a beamformed DL-MU-MIMO transmission to the STAs.

2. The apparatus of claim 1 wherein the processing circuitry is configured to encode the trigger frame for transmission a SIFS after the HE NDP to solicit MU feedback and refrain from encoding the trigger frame to solicit single-user (SU) feedback,
    wherein to solicit SU feedback, the processing circuitry is further configured to:
    set the RA of the NDP-A to a medium access control (MAC) address of a single STA; and
    decode channel state information received from the single STA, the channel state information received a SIFS after transmission of the HE-NDP.

3. The apparatus of claim 1 wherein the trigger frame is encoded to identify each of the STAs of the plurality by an association identifier (AID).

4. The apparatus of claim 1, wherein the processing circuitry is further configured to:
    encode a second trigger frame for transmission a SIFS after receipt of the HE compressed beamforming feedback frames to solicit additional MU feedback from the STAs in the same TXOP.

5. The apparatus of claim 4 wherein the parameters for beamforming are determined by the AP from the training signals, the compressed beamforming feedback, and the additional feedback.

6. The apparatus of claim 5 wherein the processing circuitry is further configured to encode the beamformed DL-MU-MIMO transmission for transmission to the STAs within the same TXOP.

7. The apparatus of claim 6 wherein the NDP-A is configured to announce the HE-NDP,
wherein the HE compressed beamforming feedback frames are concurrently received from the STAs, and
wherein each of the STAs are associated with the AP.

8. The apparatus of claim 7, wherein a number of the HE-LTFs included in the HE NDP correspond to a number of antennas used for transmission of the beamformed DL-MU-MIMO transmission.

9. The apparatus of claim 8 wherein the processing circuitry comprises baseband processing circuitry; and
wherein the apparatus further comprises transceiver circuitry configured to transmit the NDP-A, the HE NDP, and the beamformed DL-MU-MIMO transmission.

10. The apparatus of claim 9 further comprising a plurality of antennas coupled to the transceiver circuitry.

11. A non-transitory computer-readable storage medium that stores instructions for execution by processing circuitry of an access point (AP) to configure the AP for transmit beamforming and downlink (DL) multiuser (MU) multiple-input multiple output (MIMO) (DL-MU-MIMO) operation, the instructions to configured to processing circuitry to:
encode a null data packet (NDP) announcement frame (NDP-A) followed by a high-efficiency (HE) NDP to initiate an HE sounding protocol, the HE NDP configured to be transmitted a short interframe space (SIFS) after transmission of the NDP-A, the NDP-A configured solicit multi-user (MU) feedback;
configure the HE NDP to include a plurality of HE long-training fields (HE-LTFs) comprising training signals;
encode a trigger frame for transmission a SIFS after the HE NDP, the trigger frame identifying each of a plurality of stations (STAs), the trigger frame to indicate channel resources that the STAs are to use for channel estimates;
decode HE compressed beamforming feedback frames concurrently received from the STAs, the HE compressed beamforming feedback frames received within a same transmission opportunity (TXOP) during which the trigger frame was transmitted; and
determine parameters for beamforming from the training signals and the compressed beamforming feedback for a beamformed DL-MU-MIMO transmission to the STAs.

12. The non-transitory computer-readable storage medium of claim 11, wherein the processing circuitry is configured to:
encode a receiver address (RA) of the NDP-A to indicate a broadcast address to solicit multi-user (MU) feedback;
set the RA of the NDP-A to a medium access control (MAC) address of a single STA to solicit single-user (SU) feedback; and
refrain from transmission of the trigger frame for SU feedback.

13. The non-transitory computer-readable storage medium of claim 12 wherein the trigger frame is encoded to identify each of the STAs of the plurality by an association identifier (AID), and
wherein the processing circuitry is further configured to encode a second trigger frame for transmission a SIFS after receipt of the HE compressed beamforming feedback frames to solicit additional MU feedback from the STAs in the same TXOP.

14. The non-transitory computer-readable storage medium of claim 13 wherein the parameters for beamforming are determined from the training signals, the compressed beamforming feedback, and the additional feedback.

15. The non-transitory computer-readable storage medium of claim 14 wherein the processing circuitry is further configured to encode the beamformed DL-MU-MIMO transmission for transmission to the STAs within the same TXOP.

16. An apparatus of a station (STA), the apparatus comprising: memory; and processing circuitry, configured to:
decode a null data packet (NDP) announcement frame (NDP-A) followed a short interframe space (SIFS) by a high-efficiency (HE) NDP, the NDP-A and HE NDP to initiate an HE sounding protocol, the HE NDP comprising a plurality of HE long-training fields (HE-LTFs) comprising training signals;
decode a trigger frame received a SIFS after the HE NDP, the trigger frame identifying the STA and one or more other STAs associated with the AP, the trigger frame identifying channel resources that the STAs are to use for channel estimates for multi-user (MU) feedback;
determine channel state information based on receipt of the training signals;
encode a HE compressed beamforming feedback frame for transmission within a same transmission opportunity (TXOP) during which the trigger frame was transmitted, the HE compressed beamforming feedback frame based on the channel state information; the HE compressed beamforming feedback frame configured to be transmitted in the identified channel resources within a same transmission opportunity (TXOP) during which the trigger frame was received; and
receive a beamformed DL-MU-MIMO transmission from the AP in response to transmission of the HE compressed beamforming feedback frame.

17. The apparatus of claim 16 wherein the processing circuitry is configured to decode the trigger frame to determine whether an association identifier (AID) included in the trigger frame corresponds to an AID of the STA.

18. The apparatus of claim 17, wherein the processing circuitry is further configured to:
decode a second trigger frame received a SIFS after transmission of the HE compressed beamforming feedback frame, the second trigger frame to solicit additional MU feedback from the STA in the TXOP.

19. The apparatus of claim 18, wherein the HE compressed beamforming feedback frame is determined based on receipt of the training signals by the STA with two or more antennas.

20. The apparatus of claim 19, wherein the processing circuitry comprises baseband processing circuitry.

21. A method performed by an access point (AP) configured for transmit beamforming and downlink (DL) multiuser (MU) multiple-input multiple output (MIMO) (DL-MU-MIMO) operation, the method comprising:
encoding a null data packet (NDP) announcement frame (NDP-A) and an a high-efficiency (HE) NDP, the NDP-A followed by the HE NDP to initiate an HE sounding protocol, the HE NDP configured to be transmitted a short interframe space (SIFS) after transmission of the NDP-A;
encoding a receiver address (RA) of the NDP-A to indicate a broadcast address to solicit multi-user (MU) feedback;
configuring the HE NDP to include a plurality of HE long-training fields (HE-LTFs) comprising training signals;

encoding a trigger frame for transmission a SIFS after the HE NDP, the trigger frame identifying each of a plurality of stations (STAs), the trigger frame to indicate channel resources that the STAs are to use for channel estimates;

decoding HE compressed beamforming feedback frames received from the STAs, the HE compressed beamforming feedback frames received within a same transmission opportunity (TXOP) during which the trigger frame was transmitted; and determining parameters for beamforming from the training signals and the compressed beamforming feedback for a beamformed DL-MU-MIMO transmission to the STAs.

22. The method of claim 21 wherein the trigger frame is encoded for transmission a SIFS after the HE NDP to solicit MU feedback, and wherein the method further comprises refraining from encoding the trigger frame to solicit single-user (SU) feedback.

23. The method of claim 22 wherein to solicit SU feedback, the method further comprises:

encoding the RA of the NDP-A to indicate a medium access control (MAC) address of a single STA; and decoding channel state information received from the single STA, the channel state information received a SIFS after transmission of the HE-NDP.

\* \* \* \* \*

UNITED STATES PATENT AND TRADEMARK OFFICE
CERTIFICATE OF CORRECTION

PATENT NO. : 9,788,317 B2
APPLICATION NO. : 14/752250
DATED : October 10, 2017
INVENTOR(S) : Ghosh et al.

It is certified that error appears in the above-identified patent and that said Letters Patent is hereby corrected as shown below:

In the Claims

In Column 16, Line 9, in Claim 1, delete "multiuser" and insert --multi-user-- therefor In Column 16, Line 11, in Claim 1, after "comprising:", insert --¶--

In Column 16, Line 11, in Claim 1, after "and", insert --¶--

In Column 16, Line 39, in Claim 2, delete "claim 1" and insert --claim 1,-- therefor In Column 16, Line 51, in Claim 3, delete "claim 1" and insert --claim 1,-- therefor In Column 16, Line 60, in Claim 5, delete "claim 4" and insert --claim 4,-- therefor In Column 16, Line 64, in Claim 6, delete "claim 5" and insert --claim 5,-- therefor In Column 17, Line 1, in Claim 7, delete "claim 6" and insert --claim 6,-- therefor In Column 17, Line 10, in Claim 9, delete "claim 8" and insert --claim 8,-- therefor In Column 17, Line 11, in Claim 9, delete "circuitry;" and insert --circuitry,-- therefor In Column 17, Line 15, in Claim 10, delete "claim 9" and insert --claim 9,-- therefor In Column 17, Line 20, in Claim 11, delete "multiuser" and insert --multi-user-- therefor In Column 17, Line 58, in Claim 13, delete "claim 12" and insert --claim 12,-- therefor In Column 17, Line 67, in Claim 14, delete "claim 13" and insert --claim 13,-- therefor Signed and Sealed this
Twentieth Day of August, 2019

Andrei Iancu
*Director of the United States Patent and Trademark Office*

CERTIFICATE OF CORRECTION (continued)
U.S. Pat. No. 9,788,317 B2

In Column 18, Line 4, in Claim 15, delete "claim 14" and insert --claim 14,-- therefor In Column 18, Line 8-9, in Claim 16, after "comprising:", insert --¶--

In Column 18, Line 9, in Claim 16, after "and", insert --¶--

In Column 18, Line 28, in Claim 16, delete "information;" and insert --information,-- therefor In Column 18, Line 36, in Claim 17, delete "claim 16" and insert --claim 16,-- therefor In Column 18, Line 53, in Claim 21, delete "multiuser" and insert --multi-user-- therefor In Column 19, Line 15, in Claim 22, delete "claim 21" and insert --claim 21,-- therefor In Column 19, Line 21, in Claim 23, delete "claim 22" and insert --claim 22,-- therefor